(12) United States Patent
Elya

(10) Patent No.: US 12,532,977 B2
(45) Date of Patent: Jan. 27, 2026

(54) CUP WITH AN INTEGRAL INFUSION INSTRUMENT

(71) Applicant: Ofer Elya, Haifa (IL)

(72) Inventor: Ofer Elya, Haifa (IL)

( * ) Notice: Subject to any disclaimer, the term of this patent is extended or adjusted under 35 U.S.C. 154(b) by 826 days.

(21) Appl. No.: 17/795,168

(22) PCT Filed: Jan. 30, 2021

(86) PCT No.: PCT/IL2021/050108
§ 371 (c)(1),
(2) Date: Jul. 25, 2022

(87) PCT Pub. No.: WO2021/152596
PCT Pub. Date: Aug. 5, 2021

(65) Prior Publication Data
US 2023/0056670 A1    Feb. 23, 2023

Related U.S. Application Data

(60) Provisional application No. 62/967,682, filed on Jan. 30, 2020.

(51) Int. Cl.
*A47G 19/16*    (2006.01)
*A47G 19/14*    (2006.01)
*A47J 31/18*    (2006.01)

(52) U.S. Cl.
CPC .............. *A47G 19/16* (2013.01); *A47G 19/14* (2013.01); *A47J 31/18* (2013.01)

(58) Field of Classification Search
None
See application file for complete search history.

(56) References Cited

U.S. PATENT DOCUMENTS 9,089,232 B1 *   7/2015   Parazynski   .......... A47G 21/106

FOREIGN PATENT DOCUMENTS

| CN | 101467834 A | 7/2009 |
| CN | 105231763 A | 1/2016 |
| CN | 207640072 U | 7/2018 |
| EP | 2786680 B1 | 10/2018 |

OTHER PUBLICATIONS

International search report for PCT/IL2021/050108 dated Mar. 8, 2021. pp.3.
Written Opinion for PCT/IL2021/050108 dated Mar. 8, 2021. pp.5.

* cited by examiner

*Primary Examiner* — John J Norton
(74) *Attorney, Agent, or Firm* — The Roy Gross Law Firm, LLC; Roy D. Gross

(57) ABSTRACT

A tea cup with an integral infusion instrument, the infusion instrument comprising: a sieve filled with tea, and allowing liquid to flow through it while filtering the tea; a neck connected in its bottom side to the sieve, and terminating with knob at its top side; and a cover, wherein in a closed state, the cover covers the sieve, hindering flow of liquid between the cup and the tea within the sieve, and wherein pushing the knob causes downward motion of the neck and the sieve such that the cover no longer hinders the flow of liquid between the cup and the tea within the sieve.

19 Claims, 16 Drawing Sheets

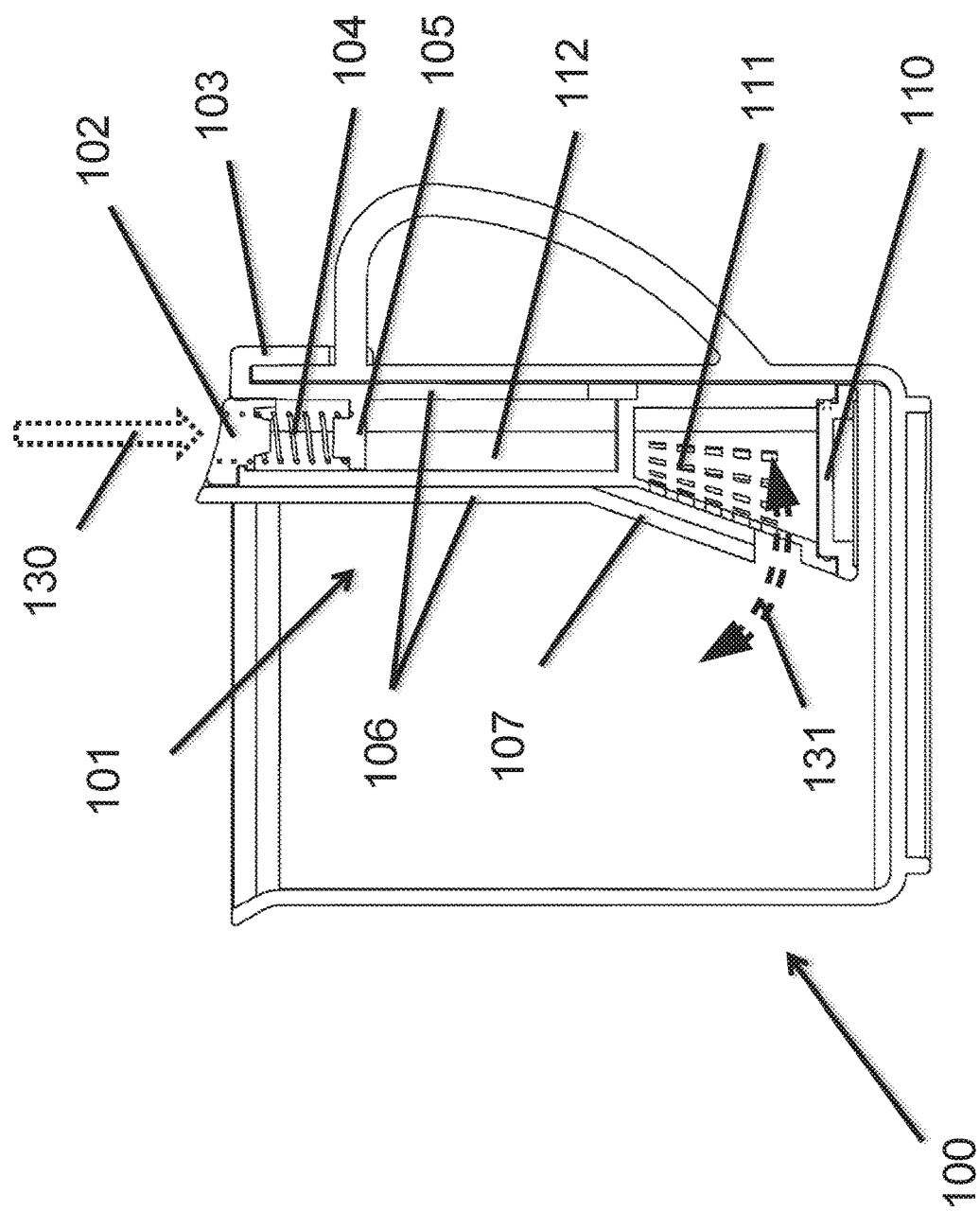

CUP WITH AN INTEGRAL INFUSION INSTRUMENT

FIELD OF THE INVENTION

The present invention relates to infusion instrument for tea and similarly used herbs, spices, and plant materials, as well as to cups for drinks made by those and methods for its manufacturing, assembly, and usage.

BACKGROUND OF THE INVENTION

Tea is the most widely consumed drink in the world other than water.

Other herbal drinks are similarly prepared and consumed, and significantly increase this market and its ever-growing need for suitable appliances. We will here refer to "tea-drinks" as a general term for all similarly made and consumed drinks, and refer to "tea" as a general term for all vegetal-sourced materials used to make such tea-drinks (e.g. herbs, spices, dried fruits, dried leafs, and roots).

Tea-drinks consumers usually have their preferences regarding extracts concentration and would also like to optimally use the tea they acquired, which is sometimes costly. This may mean reusing the same tea several times within a certain time frame or until they no longer contain enough extracts.

A more basic issue is the need to separate between the tea, which is usually unpleasant to consume, and the prepared tea-drink to be consumed. This is usually done either by preparing the drink in a separate appliance, filtering out the (now wet) tea, and pouring the tea-drink into a drinking cup. This method usually required a proper place, special larger appliances, and usually has no good control of extracts concentration.

Alternatively, a small paper bags containing the tea (a tea bag), or a manual tool including a mash (Tea Sieve) containing the tea, is inserted to the cup for preparation of the tea-drink. The tea bags or tea sieves are usually taken out before consumption of the tea-drink. These methods are somewhat awkward and necessitate safe disposal of the wet tea bag, or massy emptying the tea sieve. These methods become more awkward if an attempt to reuse the tea is being made.

Chinese patent CN101467834A discloses a tea set container and a method of brewing tea-drink. The tea set includes a tea storing bay with a sealed moveable door in the inner of the tea set container. The sealed moveable door that is easy to open and close by an operating mechanism.

SUMMARY OF THE INVENTION

There is thus a need for an appliance in which the tea-drink may be both elegantly prepared and conveniently consumed, while controlling the extracts concentration and optimally reusing the tea.

One aspect of some embodiments of the current invention provides a drinking cup for tea-drinks with an integrated preparation instrument.

Another aspect of some embodiments of the current invention is to provide a preparation instrument capable of controlling the extracts concentration in the tea-drink.

Another aspect of some embodiments the current invention is to provide a preparation instrument capable of efficiently reusing the tea.

Yet another aspect of some embodiments of the current invention is to provide a preparation instrument that is easy and simple to fill, operate, and clean, without dripping and dirtying.

One aspect of some embodiments is to provide an internal infusion instrument, for preparing tea-drink in a tea cup comprising: a sieve, to be filled with tea, and allowing liquid to flow through it while filtering the tea; a neck connected in its bottom side to the sieve, and terminating with knob at its top side; a grip, for holding the internal infusion instrument to a rim of a cup; and a cover connected to the grip, wherein in a closed state, the cover covers the sieve, hindering flow of the liquid between the cup and the tea within the sieve, and wherein pushing the knob causes downward motion of the neck and the sieve, such that the cover no longer hinders the flow of liquid between the cup and the tea within the sieve.

In some embodiments the internal infusion instrument further comprises a cup for holding tea-drink, having a rim, wherein the cup is configured such that the grip holds the internal infusion instrument to the rim of the cup.

In some embodiments the internal infusion instrument can be removed from the cup for cleaning the sieve and for filling the sieve with tea, and to be installed on the cup, such that the sieve is inside the cup, for preparation of tea-drink.

In some embodiments the internal infusion instrument further comprises a spring, connected between the cover and the neck, keeping the sieve in a closed state when the knob is not pushed.

In some embodiments pushing the knob causes forced flow of liquid into the sieve.

In some embodiments the releasing the knob causes forced flow of liquid out the sieve.

In some embodiments pushing the knob causes forced flow of liquid from the cup into the sieve.

In some embodiments releasing the knob causes forced flow of liquid out the sieve into the cup.

In some embodiments the internal infusion instrument further comprises a bottom cover at the bottom of the sieve, the cover is configured to: be opened to clean the inside of the sieve and to fill the sieve with tea, and to close the sieve for holding the tea within the sieve.

In some embodiments the width of the sieve is narrower at the point it is connected to the neck than its width at the bottom cover.

In some embodiments the shape of the sieve is conical.

In some embodiments the internal infusion instrument e shape of the sieve is a pyramidal.

In some embodiments the internal infusion instrument, when installed on the cup, is installed such that the sieve is located below the upper one third of the height of the cup.

In some embodiments the internal infusion instrument, when installed on the cup, is installed such that the sieve is located below the upper one half of the height of the cup.

The internal infusion instrument claim 14, wherein the internal infusion instrument, when installed on the cup, is installed such that the sieve is located below the upper two thirds of the height of the cup.

In some embodiments the internal infusion instrument the bottom cover is located near the bottom of the cup when the internal infusion instrument is installed on the cup.

In some embodiments pushing the knob causes forced flow of liquid into the sieve when the cup is half full of liquid.

In some embodiments pushing the knob can be repeated to increase the concentration of the tea-drink.

In some embodiments the tea in the sieve ran be replaced, and pushing the knob can be repeated to increase the concentration of the tea-drink.

Another aspect of some embodiments is to provide a podium infusion instrument to be used with a tea cup comprising: an infusion instrument comprising: a flexible container, for holding tea; a cup fitting having a sieve, allowing liquid to flow through it while filtering the tea; a squeezing mechanism, configured to cause liquid flow when activated to squeeze the flexible container; and a cup for holding tea-drink, the cup is having a hole at the bottom, the cup is configured to be assembled and disassembled on top of the podium infusion instrument, such that the sieve is located against the hole in the bottom of the cup; and a cover having a valve, the valve allowing liquid flow from the flexible container to the cup when the squeezing mechanism is activated to squeeze the flexible container.

In some embodiments the squeezing mechanism comprises a tong-like squeezing beam to push on the bottom of the flexible container causing liquid flow from the flexible container to the cup.

In some embodiments the squeezing mechanism comprises at least one arm to push on at least one side of said flexible container causing liquid flow from said flexible container to the cup.

In some embodiments the squeezing mechanism comprises two arms to push on two sides of the flexible container causing liquid flow from the flexible container to the cup.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting. In particular, production materials may be any suitable food contact materials; more rigid parts may be made of materials including but not limited to plastic, stainless steel, aluminum, glass, bamboo, and bioplastics; softer or more flexible parts may be made of materials including but not limited to silicone-rubber, rubber, and plastic.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1C schematically shows a vertical cross-sectional view of the cup with the integral internal infusion instrument in a pushed-open position.

DESCRIPTION OF THE PREFERRED EMBODIMENTS

Figure 1A:
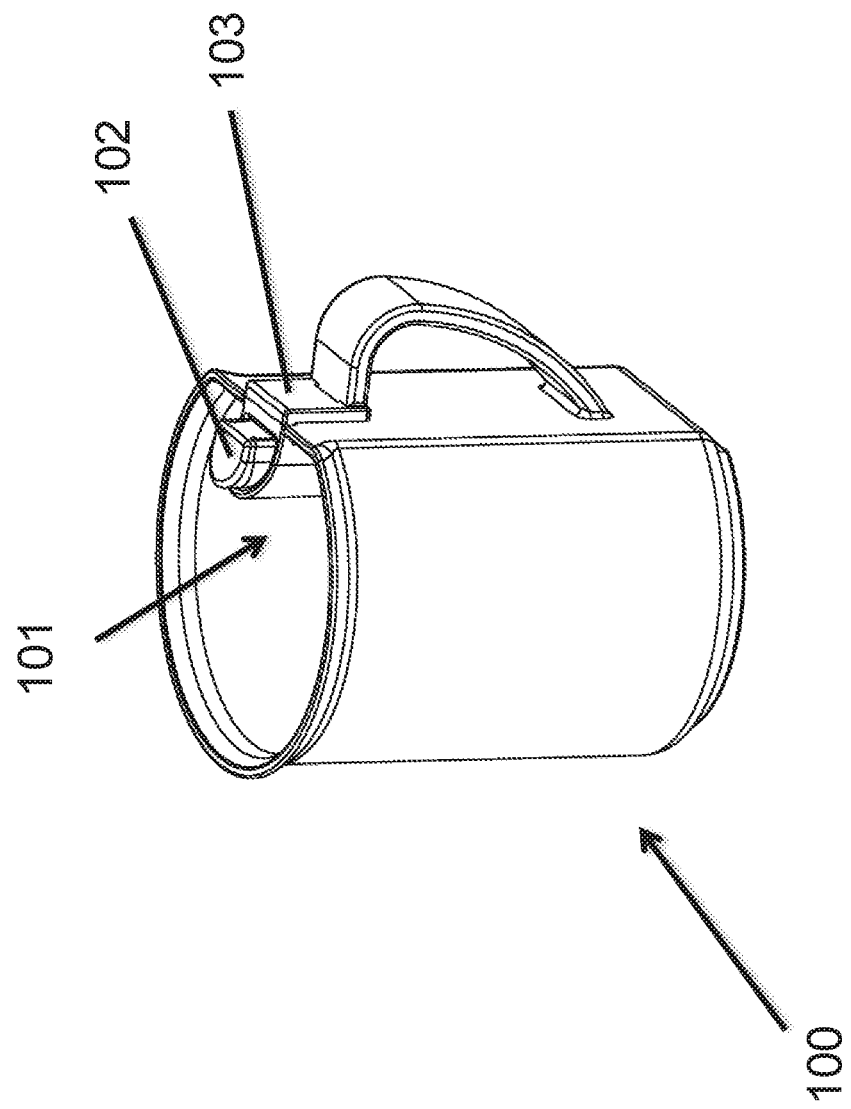
FIG. 1A schematically shows a general external view of a cup with an integral internal infusion instrument assembled from above according to an exemplary embodiment of the current invention.

The present invention relates to infusion instrument for tea and similarly used herbs, spices, and plant materials, as well as to cups for drinks made by those and methods for its manufacturing, assembly, and usage.

Before explaining at least one embodiment of the invention in detail, it is to be understood that the invention is not limited in its application to the details of construction and the arrangement of the components set forth in the following description or illustrated in the drawings. It should be further understood that the significantly different exemplary embodiments described by the different figures, collectively describe one general concept. The invention is capable of other embodiments or of being practiced or carried out in various ways. Also, it is to be understood that the phraseology and terminology employed herein is for the purpose of description and should not be regarded as limiting.

In discussion of the various figures described herein below, like numbers refer to like or identical parts. For clarity, non-essential elements were omitted from some of the drawings.

Figure 1B:
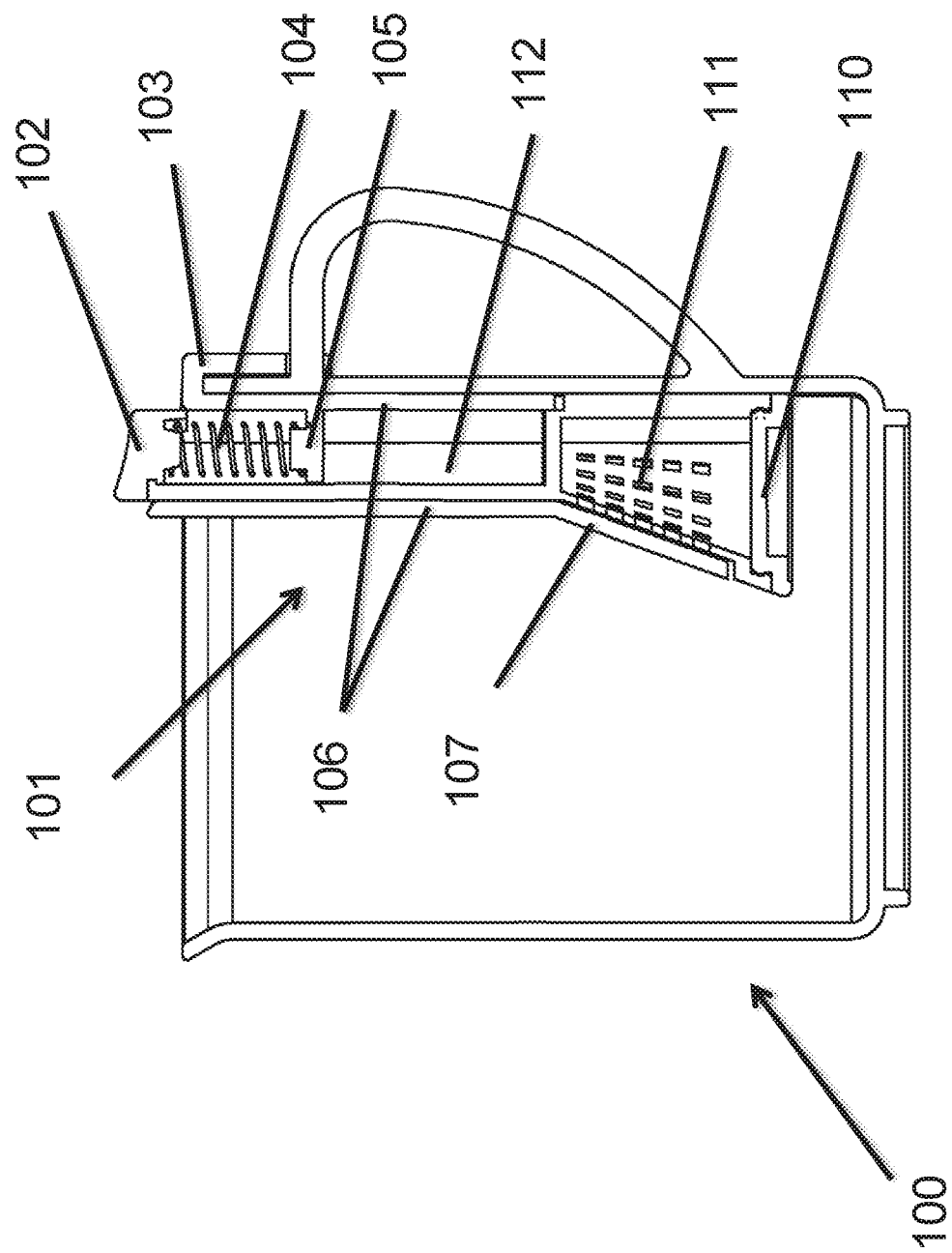
FIG. 1B schematically shows a vertical cross-sectional view of the cup with the integral internal infusion instrument in a closed position.

FIGS. 1A-C describe an exemplary mechanism and embodiment based on an integral internal infusion instrument assembled from above in the teacup.

FIG. 1A schematically shows a general external view of a cup 100 with an integral internal infusion instrument 101 according to an exemplary embodiment of the current invention.

FIG. 1B schematically shows a vertical cross-sectional view of the cup 100 with the integral internal infusion instrument 101 in a closed position.

FIG. 1C schematically shows a vertical cross-sectional view of the cup 100 with the integral internal infusion instrument 101 in a pushed-open position.

In contrast to the conventional methods, an instrument may be used to implement the infusion process inside of a cup. This may be a Teabag, Sieve, or Capsule Infuser filled with the infusion material. However, those are normally removed from the cup before drinking. This last step is somewhat cumbersome and usually creates dripping and/or other inconveniences. Another traditional option, common in South America, is infusing the material in the cup (Guampa, Cuia), but in this case a filtered straw is needed for drinking (known as Bombilla or Bomba).

In contrast, the integral internal infusion instrument 101 allows the infusion process to reside inside the cup 100 and allows drinking without the need to remove the internal infusion instrument 101, and, without dripping or other kinds of inconveniences.

The following explanation of the mechanism operation refers to all the different parts of FIGS. 1A-C; each part will also be described below.

Before starting tea-drink preparation, the internal infusion instrument 101 is separated or should be separated from the cup 100. The bottom cover 110 is removed, and the sieve 111 is filled with tea. Now, the bottom cover 110 is placed back to its position at the bottom of the sieve 111, and the internal infusion instrument 101 is inserted and fixed into the cup 100. At this point the device is ready for tea-drink infusion after cup 100 is filled with hot water (or some other appropriate liquid).

After filling the cup with hot water, pushing the knob 102 opens the integral internal infusion instrument 101, create a liquids flow 131, into the conical sieve 111, infuse the tea and create extracts. Preferably, the user keeps knob 102 in the pushed position for several seconds as the integral internal infusion instrument 101 is opened as long as knob 102 is held pushed, and is closed when knob 102 is released. Extract concentration is thus may be controlled by the duration of the knob pushing. Pushing knob 102 again sometime later creates a bi-directional liquid flow 131 and release some concentrated infused water into the cup 100. With a bit of experience, the tea drinker can learn how deep, for how long, and/or how many times knob 102 should be pushed to produce the best tea-drink for her/his personal preference.

It should be noted that sieve 111 may have shape other than conical, for example a cylindrical, pyramidical, or part of a sphere.

For cleaning, the internal infusion instrument 101 can be separated from the cup 100. The cup 100 may be cleaned as any other cup. The internal infusion instrument 101 can be disassembled by removing the bottom cover 110 and can be rinsed while pushing the upper push knob 102 a few times, to let the water and/or any detergent clean all relevant parts.

FIG. 1A schematically shows a general external view of a cup 100 with an integral internal infusion instrument 101 according to an exemplary embodiment of the current invention.

In FIG. 1A, most of the integral internal infusion instrument 101 is hidden, so as to create an elegant cup. However, the upper push knob 102 is noticeable above the cup.

Also noticeable in FIG. 1A is the instrument grip 103, which is part of the mechanism holding the instrument firmly attached to the cup, while also allowing it to be easily released for cleaning and filling. The instrument gripping may be implemented, for example, as a sliding dovetail joint, one of several easily releasable snap joints, or as a belt/holster spring clip like gripping mechanism. Many other gripping and fastening mechanisms are known in the art and some of those may apply.

Optionally, the instrument grip 103 may be sized to fit several type of commercially available cups, thus the internal infusion instrument 101 according to an exemplary embodiment of the current invention may be sold separately, or be moved among several cups. Optionally, grip 103 may be made from a flexible material to allow attaching the internal infusion instrument 101 to several types of cups.

FIG. 1B schematically shows a cross-sectional view of the cup 100 with the integral internal infusion instrument 101 in a closed position. Here, the push knob 102 is in released position. Below the push knob 102 a spring 104 is located, to return the push knob back up when it is released from pushing. The other end of the spring 104 is located on a cantilevered plate 105 anchored to one of the sides of the external neck 106 of the internal infusion instrument 101. Also, below the push knob 102 is the internal infusion instrument's 101 internal neck 112. The internal neck 112 bottom is anchored to the top of a conical sieve 111. In the closed position, the external conical cover 107 covers the conical sieve 111 sides. The bottom cover 110 is sealing the conical sieve 111 bottom.

While in the closed position described by FIG. 1B, no significant fluid flow is possible between the inside of the conical sieve 111 and the rest of the cup 100. Normally, the tea is located inside the conical sieve 111. If infused tea extracts exist at conical sieve 111, it will not be released to the rest of the cup 100, while in this closed position.

For cleaning and filling the whole internal infusion instrument 101 may be released from the cup 100 by releasing the grip 103. The bottom cover 110 can then be opened, used tea can be emptied and cleaned, and new tea may be filled.

FIG. 1C schematically shows a cross-sectional view of the cup 100 with the integral internal infusion instrument 101 in a pushed-open position. Here, the push knob 102 is pushed down 130. Below the push knob 102 the spring 104 is squeezed, and will elevate the push knob 102 back up when knob 102 is released. In the pushed-open position, the internal neck 112 is pushed down with the knob 102. The conical sieve 111, anchored to the internal neck 112 is lowered and is exposed from the sealing by the external conical cover 107. Liquids can now flow 131 between its content and through the conical sieve 111 from and/or to the rest of the cup 100.

The purpose of the flow 131 is two folded: First, hot (or in some cases cold) water residing in the cup 100 may flow 131 into the conical sieve 111, infuse the tea and create extracts. Those extracts, when blended in a wanted ratio with the cup 100 water, thus creating the wanted tea-drink.

Second, water with high concentration of extract may flow 131 from the conical sieve 111 to the rest of the cup to blend and create the wanted tea-drink.

A reasonable usage scenario may be for the tea drinker to first push 130 the knob 102 to let hot water flow 131 into the conical sieve 111 and release after a few seconds. Then, after some period of time the tea drinker will again push 130 the knob 102 one or more times to let high extracts concentration water flow 131 to the rest of the cup 100, blend and create the tea-drink. The tea drinker may later refill the cup 100 with water and then push 130 the knob 102 again one or more times to create more of the tea-drink. All the timing, number of pushing, and quantity of tea will be learned by experience and/or experimentation.

It should be noted that pushing knob 102 lowers the conical sieve 111 creating active forced flow of liquid through the tea in the conical sieve, thus making the infusion process, and distribution of the extract within the cup more effective It should be noted that the cup 100 with the internal infusion instrument 101 has a low center of gravity even when tea was consumed, thus increasing the stability of the cup. This is in contrast to the device of the prior art as disclosed in the Chinese patent CN101467834A, where the wet tea in infusion device may cause the cup to be top-heavy when the tea-drink has been partially or completely consumed.

It should be noted, in contrast to the CN101467834A prior art, that the tea filled sieve 111 is located near the bottom of cup 100. Thus, infusion action is possible by pressing knob 102 even if cup 100 is partially full. For example, a user can press knob 102 once or several times after consuming part of the tea-drink to increase the concentration of the extract within the remainder of the tea-drink. Additionally, the user may add a small amount of liquid, for example refilling cup 100 to its half, and repeat the infusion process.

FIGS. 2A-G describe an integral podium infusion instrument installed below or at the bottom of the teacup, according to another exemplary embodiment of the current invention. In this exemplary embodiment the reasoning and usage is quite similar to the exemplary embodiment described in FIGS. 1A-C.

The following explanation of the mechanism operation refers to all the different parts of FIGS. 2A-G; each part will also be described below.

Figure 2A:
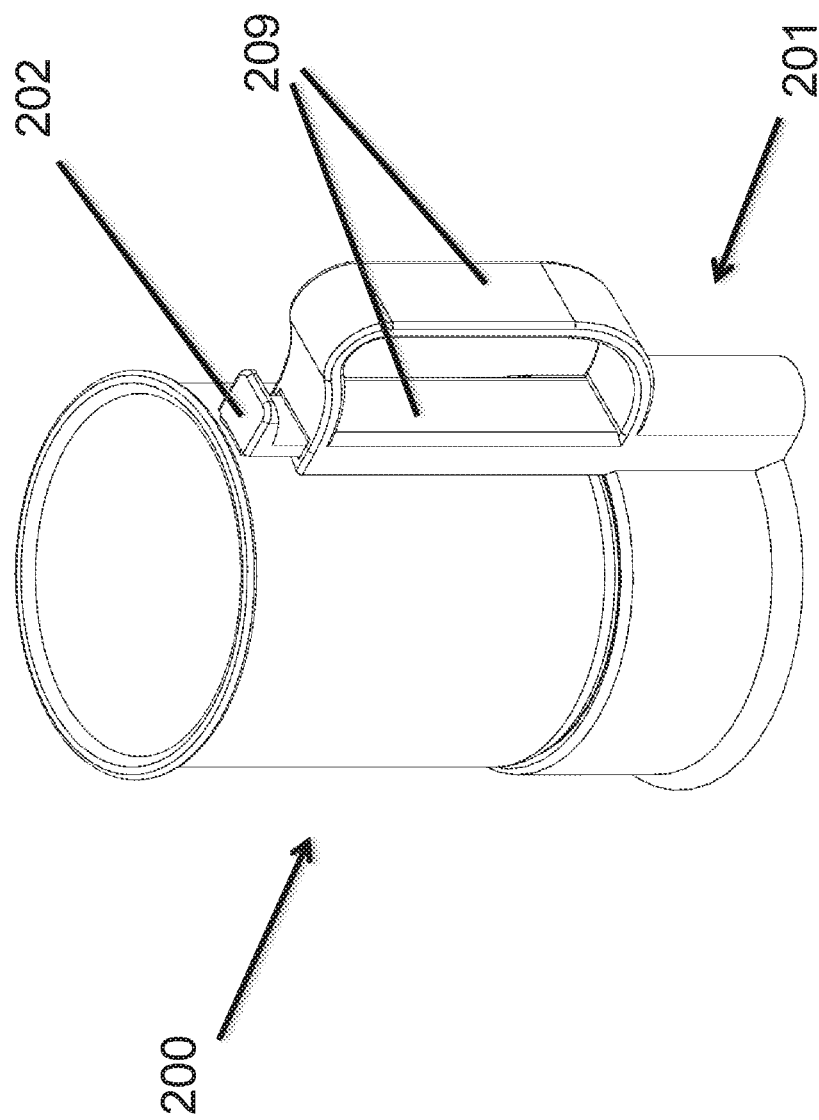
FIG. 2A schematically shows a general external view of a cup with an integral podium infusion instrument assembled from below and an upper push knob according to another exemplary embodiment of the current invention.

FIG. 2A schematically shows a general external view of a cup 200 with an integral podium infusion instrument 201 and an upper push knob 202 according to exemplary embodiment of the current invention.

Figure 2B:
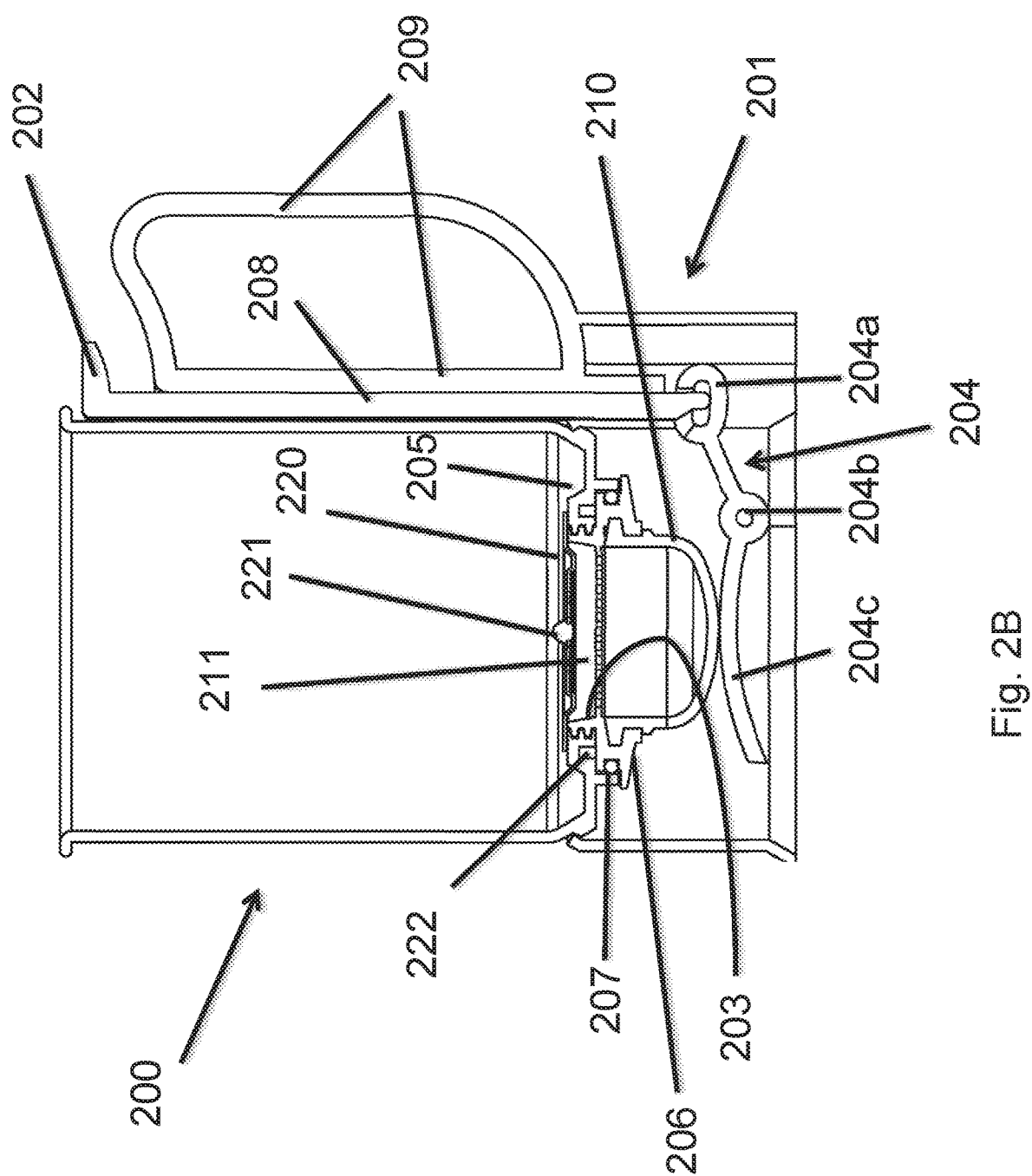
FIG. 2B schematically shows a vertical cross-sectional view of the cup with the integral podium infusion instrument in a closed position.

FIG. 2B schematically shows a vertical cross-sectional view of the cup 200 with the integral podium infusion instrument 201 in a closed position.

Figure 2C:
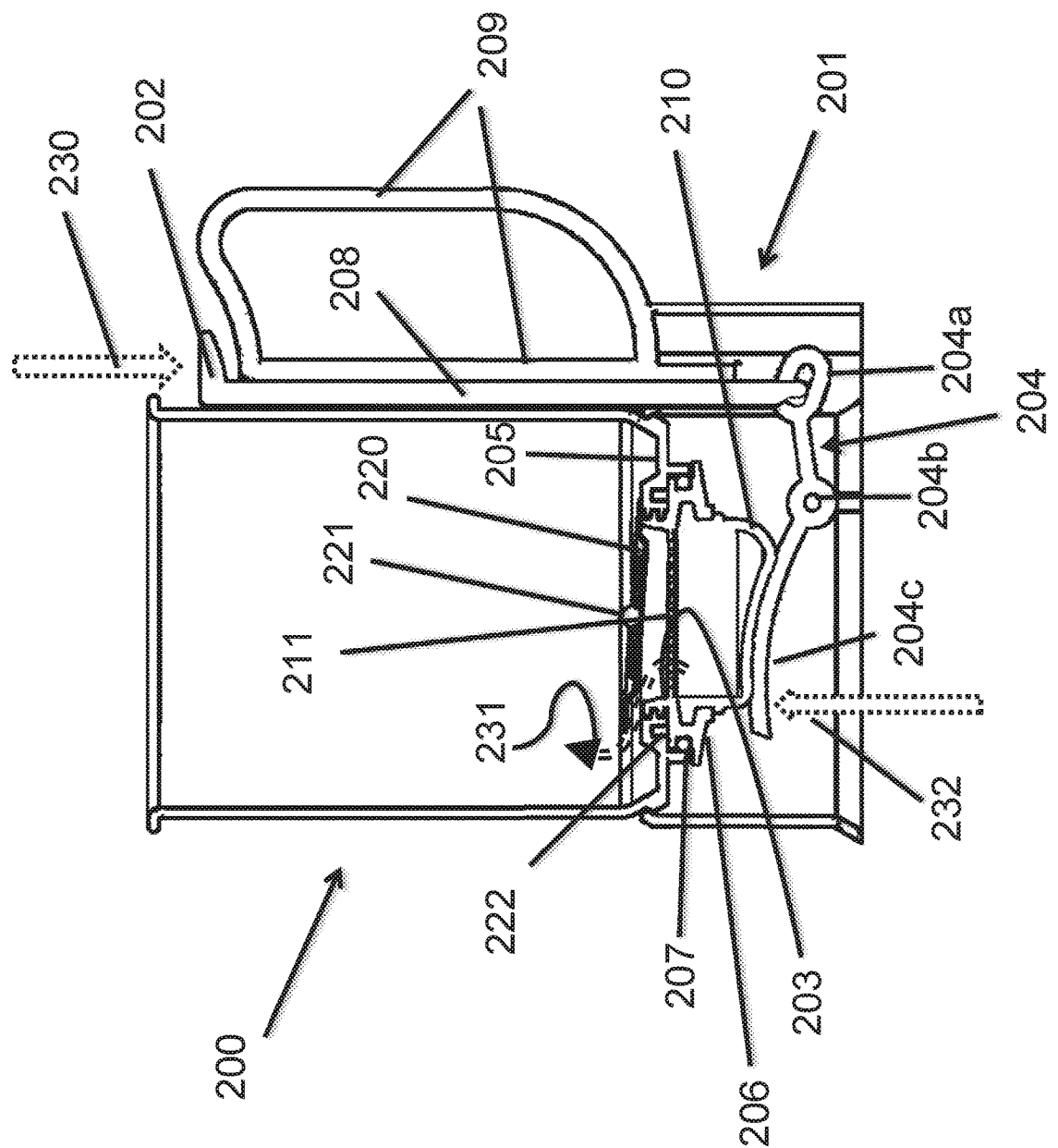
FIG. 2C schematically shows a vertical cross-sectional view of the cup with the integral podium infusion instrument in a pushed position.

FIG. 2C schematically shows a vertical cross-sectional view of the cup 200 with the integral podium infusion instrument 201 in a pushed position.

Figure 2D:
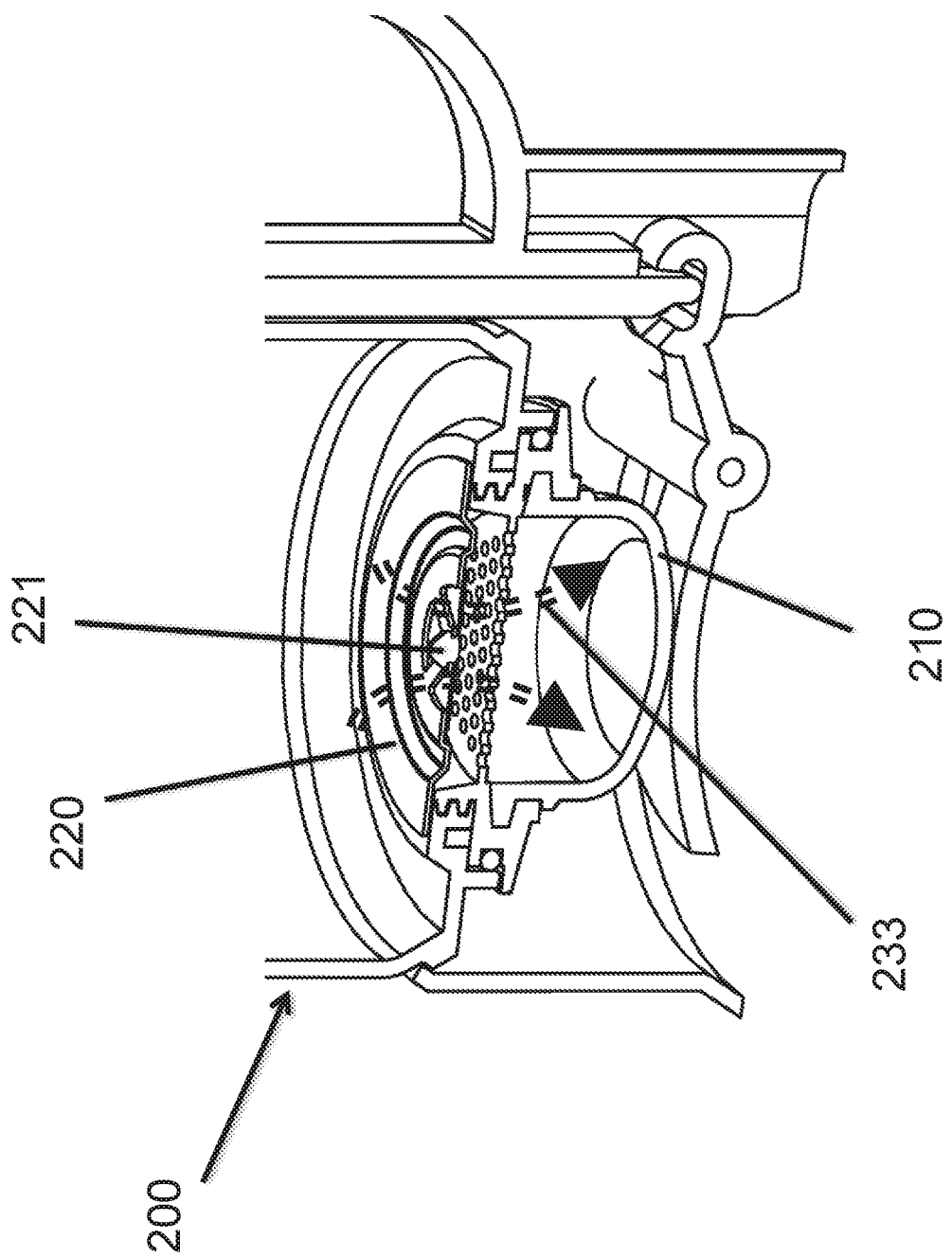
FIG. 2D schematically shows a 3-dimensional vertical cross-sectional view of the integral podium infusion instrument seen in FIGS. 2A-C, in which a top magnetic cover is equipped with a valve to allow unidirectional flow through a sieve into a flexible container.

FIG. 2D schematically shows a 3-dimensional vertical cross-sectional view of the integral podium infusion instrument 201 in which the top magnetic cover 220 is equipped with a valve 221 to allow unidirectional flow 233 through the sieve 211 into the flexible container 210.

Figure 2E:
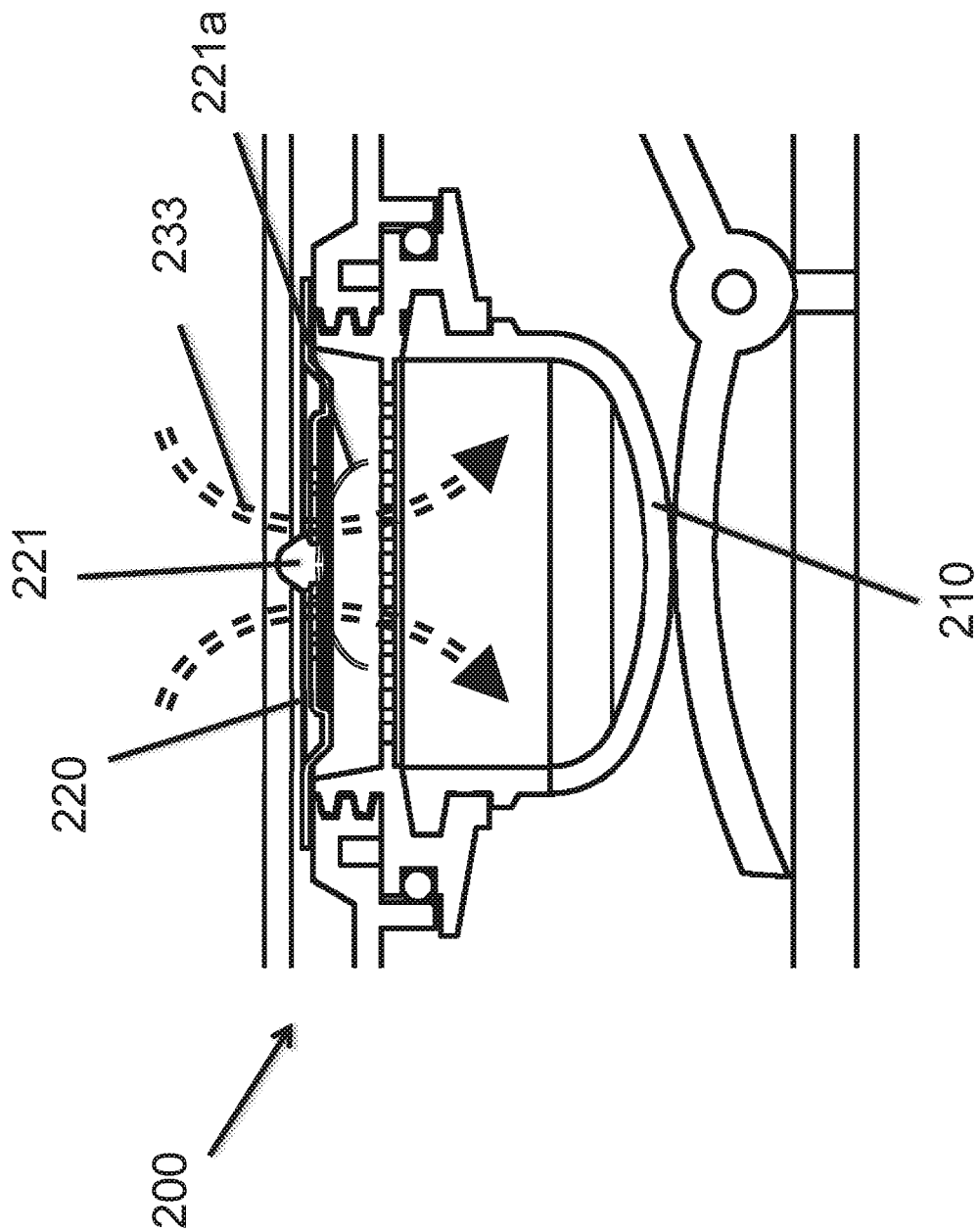
FIG. 2E schematically shows a 2-dimensional vertical cross-sectional view of the integral podium infusion instrument seen in FIGS. 2A-D in which the top magnetic cover is equipped with a valve to allow unidirectional flow through the sieve into the flexible container.

FIG. 2E schematically shows a 2-dimensional vertical cross-sectional view of the integral podium infusion instrument 201 in which the top magnetic cover 220 is equipped with a valve 221 to allow unidirectional flow 233 through the sieve 211 into the flexible container 210.

Figure 2F:
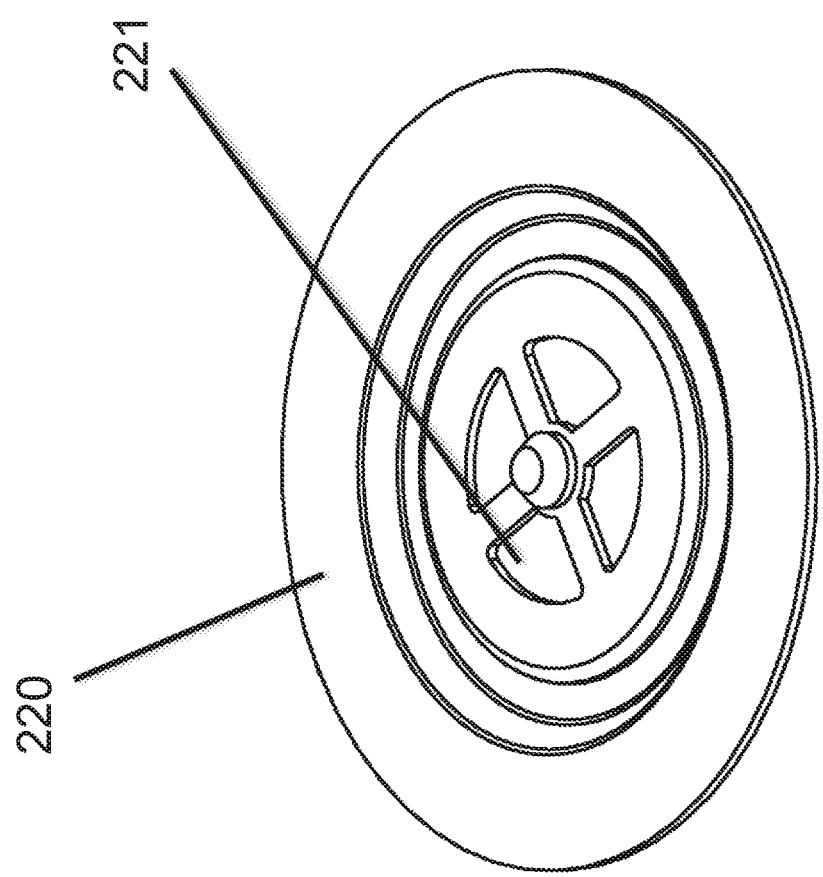
FIG. 2F schematically shows a 3-dimensional view from above of the top magnetic cover with the valve.

FIG. 2F schematically shows a 3-dimensional view from above of the top magnetic cover 220 with the valve 221.

Figure 2G:
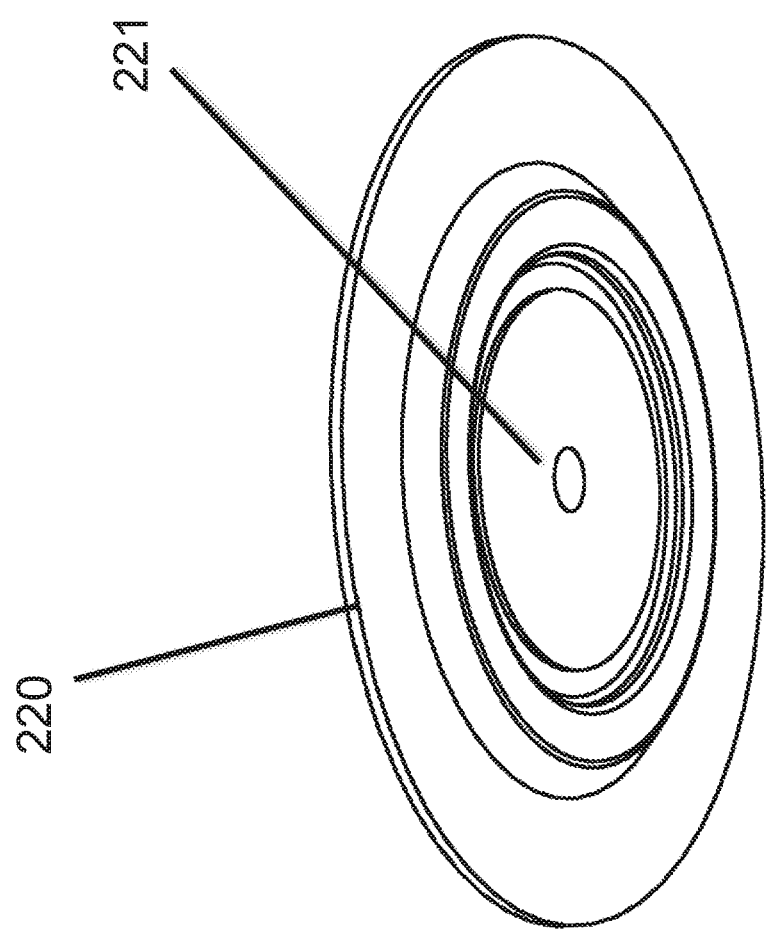
FIG. 2G schematically shows a 3-dimensional view from below of the top magnetic cover with the valve.

FIG. 2G schematically shows a 3-dimensional view from below of the top magnetic cover 220 with the valve 221.

Before starting tea-drink preparation, the integral podium infusion instrument 201 should be disassembled by taking the cup 200 off the integral podium infusion instrument 201. The flexible container 210 is removed from the cup fitting 206 and is filled with tea. Now, the flexible container 210 is placed back to its position at the bottom of the cup fitting 206, and the cup 200 is inserted and fixed onto the integral podium infusion instrument 201. At this point the device is ready for tea-drink infusion and should be filled with hot water (or some other appropriate liquid).

After filling the cup with hot water, pushing the knob 202 for a few seconds will push and squeeze the flexible container 210. In this case, if the flexible container 210 is initially empty from liquid, when the push knob 202 is released, the flexible container 210 is expanding back, and water from the cup 200 is sucked in 233 through the valve 221. If the flexible container 210 is initially full of liquid, pushing and releasing the push knob 202 creates both in and out flow of liquids 231 and the liquids sucking flow 233 respectively. With a bit of experience, the tea drinker will learn how much and how many pushing is needed to produce the best tea-drink for her/his personal preference.

For cleaning, the integral podium infusion instrument 201 is separated from the cup 200. The top magnetic cover 220 can then be removed from the cup 200 and rinsed. The flexible container 210 can be removed from the cup fitting 206, emptied, and rinsed. The cup fitting 206 should be unscrewed from the cup 200 and rinsed. Now the cup 200 may be cleaned as any other cup. The rest of the integral podium infusion instrument 201 may be cleaned like any other kitchen tool.

The integral podium infusion instrument 201 is operated using the push knob 202. However, here the integral podium infusion instrument 201 is located below the cup 200. It should be noted this dictate having a hole at the bottom of cup 200. This hole is closed from below by the integral podium infusion instrument 201. Also seen in FIG. 2A is the cup handle 209, which is here part of the integral podium infusion instrument 201.

FIG. 2B schematically shows a cross-sectional view of the cup 200 with the integral podium infusion instrument 201 in a closed position.

Starting at the push knob 202, an extension rod 208 is going through the cup handle 209 and into the lever connector 204a. The lever 204 extends from the lever connector 204a, through its connection to the fulcrum 204b, and to the tong-like squeezing beam 204c. Above the lever 204 is the flexible container 210, which is connected at the bottom of the cup fitting 206. The cup fitting 206 is connected to the cup 200 at the cup hole edge 205. In this exemplary embodiment the fitting 206 has a screw-like helical ridge 203, which is screwed to the hole edge 205; however, the fitting may be done using one of several possible options known in the art. To obtain good sealing, an O-ring seal 207 is also fitted between the cup fitting 206 and the hole edge 205. The hole edge 205 also holds a magnetic ring 222, designed to put and hold the top magnetic cover 220 in place. At the center of the magnetic cover 220 there is a unidirectional valve 221 allowing liquids to flow down from the cup 200 into the infusion instrument assembled from below 201. At the center of the cup fitting 206 a sieve 211 is located. The sieve 211 is designed to allow free flow of liquids up and down, while filtering the tea itself.

FIG. 2C schematically shows a vertical cross-sectional view of the cup 200 with the integral podium infusion instrument 201 in a pushed position, where the flexible container 210 contains liquids before the pushing starts. As the knob 202 is now pushed down 230, the extension rod 208 is pushing down the lever connector 204a. Hence, the tong-like squeezing beam 204c is elevated 232 and squeezing the flexible container 210. As the flexible container 210 volume is reduced, liquids are pushed out, filtered through the sieve 210, pushing the top magnetic cover 220 up, and flowing 231 into the cup 200.

FIG. 2D schematically shows a 3-dimensional vertical cross-sectional view of the integral podium infusion instrument 201 in which the top magnetic cover 220 is equipped with a valve 221 to allow unidirectional flow 233 through the sieve 211 into the flexible container 210. This occurrence is a direct result of releasing the push knob 202 after it was pushed, such that the flexible container 210 that was contracted is now expending and is sucking liquids back.

FIG. 2E schematically shows a vertical cross-sectional partial view of the integral podium infusion instrument 201 in which the top magnetic cover 220 is equipped with a valve 221 to allow unidirectional flow 233 through the sieve 211 into the flexible container 210. FIG. 2E shows the same occurrence as in FIG. 2D, from a different point of view. Added in FIG. 2F is a valve flexible cover 221a symbolically curved by the liquid pressure, to represent the operation of valve 221.

FIG. 2F schematically shows a 3-dimensional view from above of the top magnetic cover 220 with the valve 221.

FIG. 2G schematically shows a 3-dimensional view from below of the top magnetic cover 220 with the valve 221.

FIGS. 3A-F describe yet another exemplary mechanism which in its operation is similar to the mechanism described in FIG. 2A-G. However, the mechanical interface of this exemplary embodiment is different-instead of a push button from above here a push button from below is introduced. The main purpose of this third exemplary embodiment is showing there may be other different embodiments for the same basic concept; all are within the general object of the current invention. The internal mechanism of the integral squeezable podium infusion instrument 301 is similar to the mechanism described in FIGS. 2A-G, hence the common elements are marked with the same numbers.

The following explanation of the mechanism operation refers to all the different parts of FIGS. 3A-F; each part will also be described below.

Figure 3A:
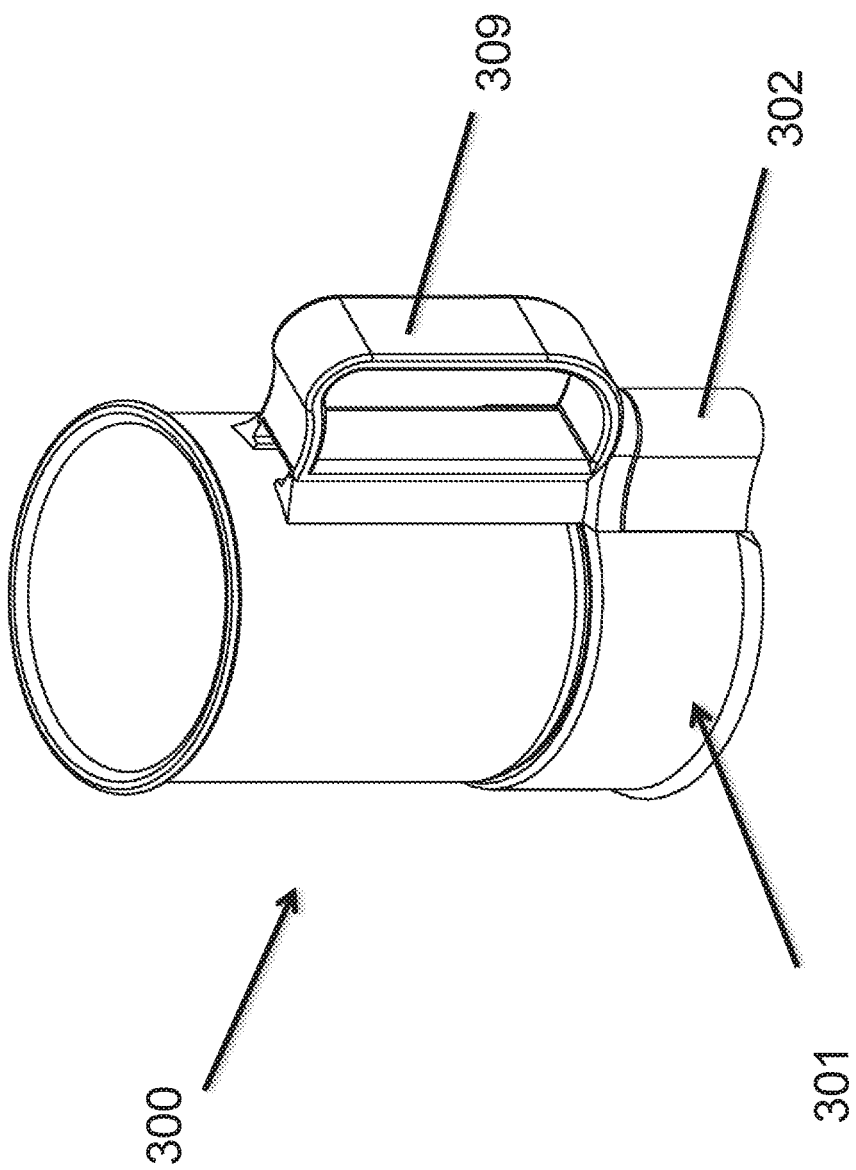
FIG. 3A schematically shows a general external view of a cup with an integral squeezable podium infusion instrument having a lower push knob according to yet another exemplary embodiment of the current invention.

FIG. 3A schematically shows a general external view of a cup 300 with the integral squeezable podium infusion instrument 301 and a lower push knob 302 according to an exemplary embodiment of the current invention.

Figure 3B:
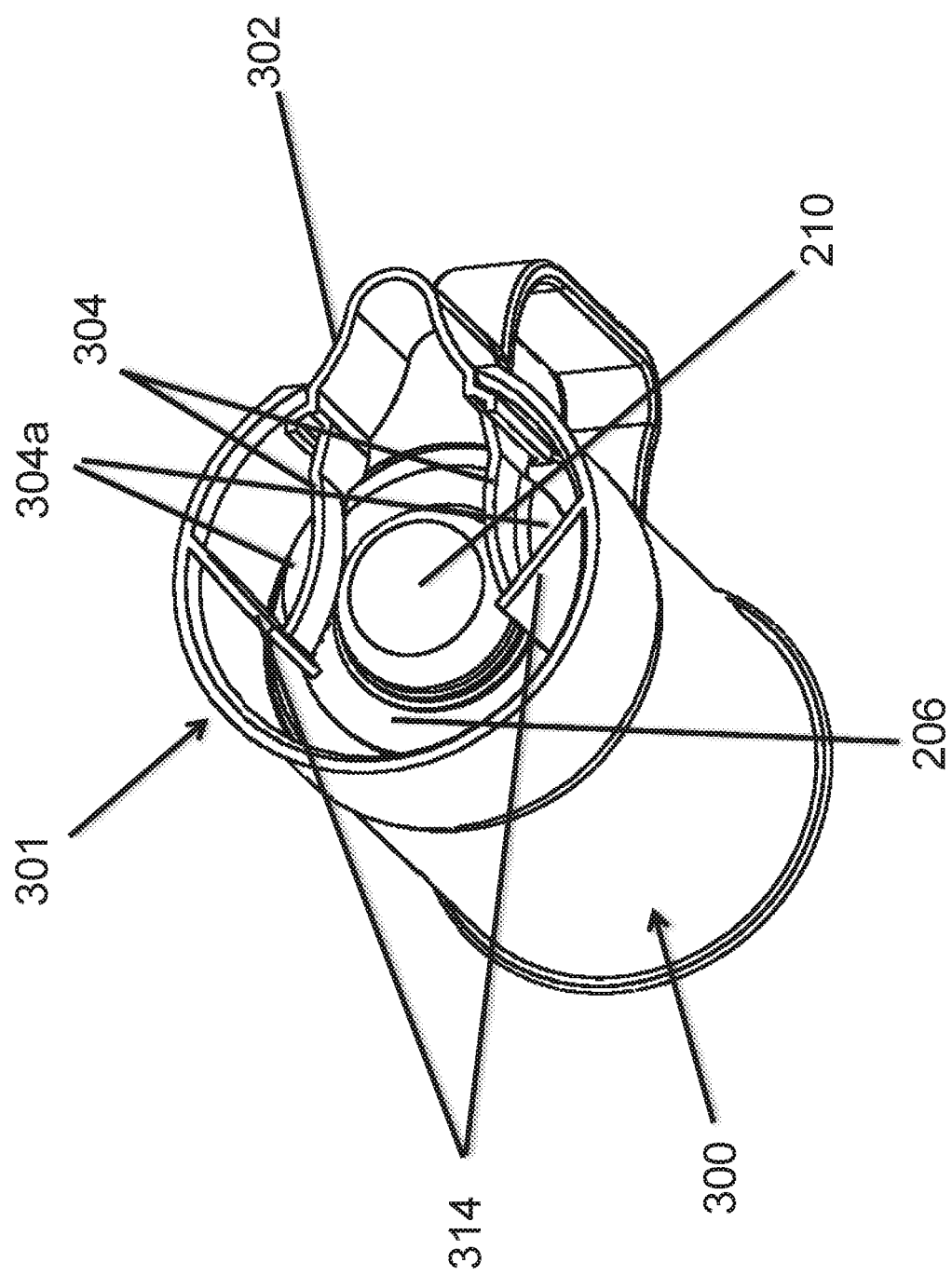
FIG. 3B schematically shows a view from underneath of the cup with the integral squeezable podium infusion instrument and a lower push knob in a natural position.

FIG. 3B schematically shows a view from underneath of the cup 300 with the integral squeezable podium infusion instrument 301 and a lower push knob 302 in a natural position.

Figure 3C:
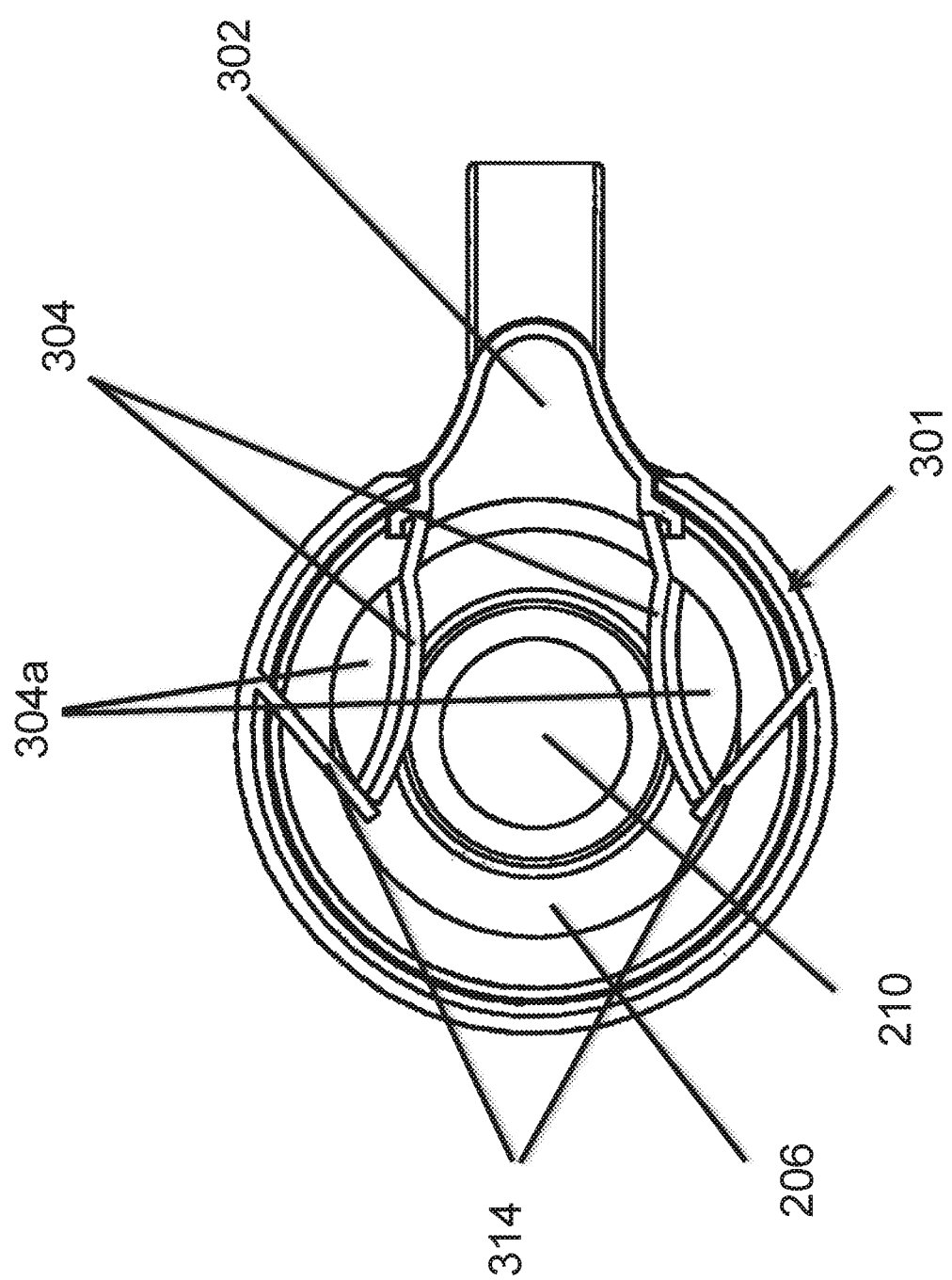
FIG. 3C schematically shows a horizontal cross-sectional view of the cup with the integral squeezable podium infusion instrument in a natural position.

FIG. 3C schematically shows a horizontal cross-sectional view of the cup 300 with the integral squeezable podium infusion instrument 301 in a natural position.

Figure 3D:
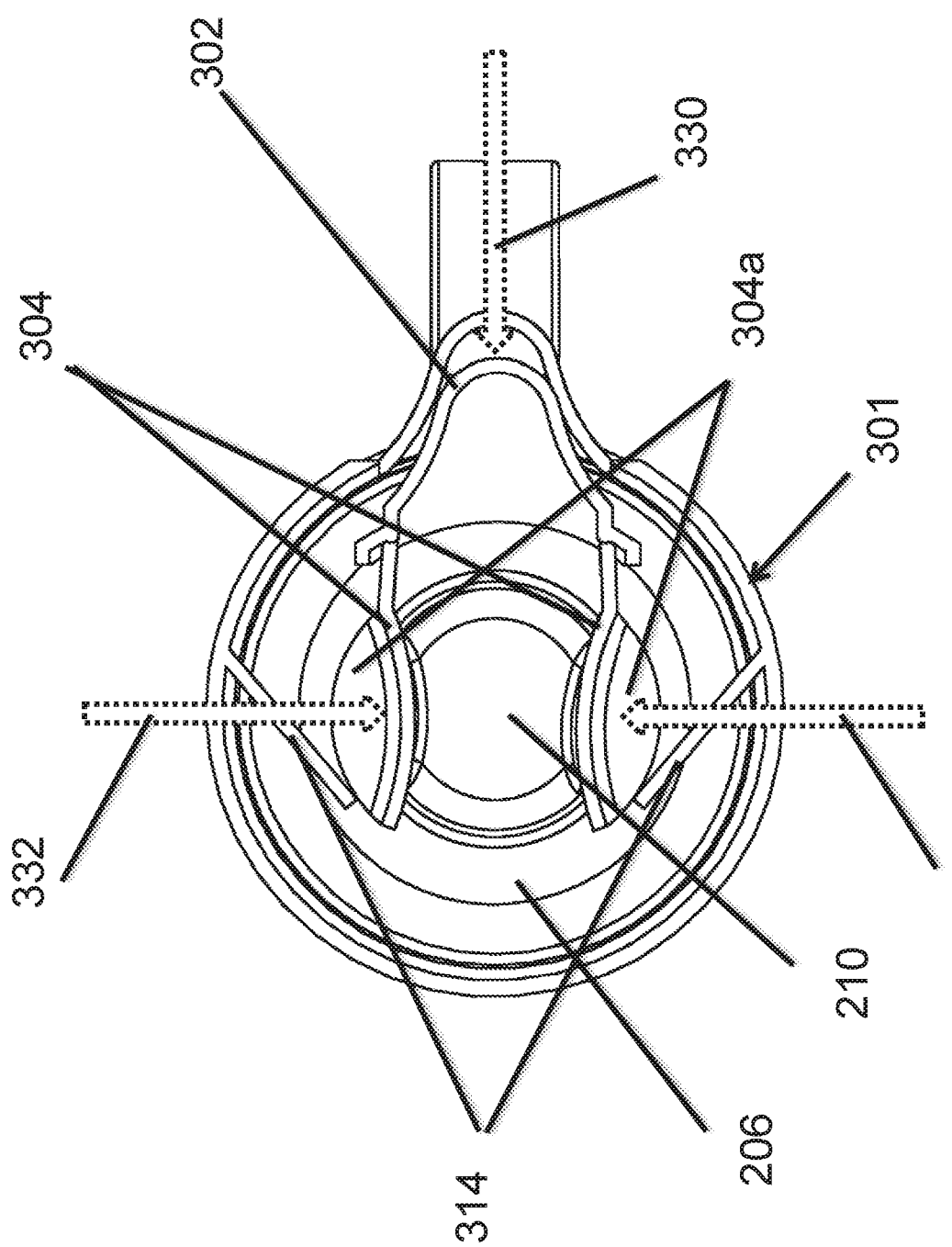
FIG. 3D schematically shows a horizontal cross-sectional view of the cup with the integral squeezable podium infusion instrument in a pushed position.

FIG. 3D schematically shows a horizontal cross-sectional view of the cup 300 with the integral squeezable podium infusion instrument 301 in a pushed position.

Figure 3E:
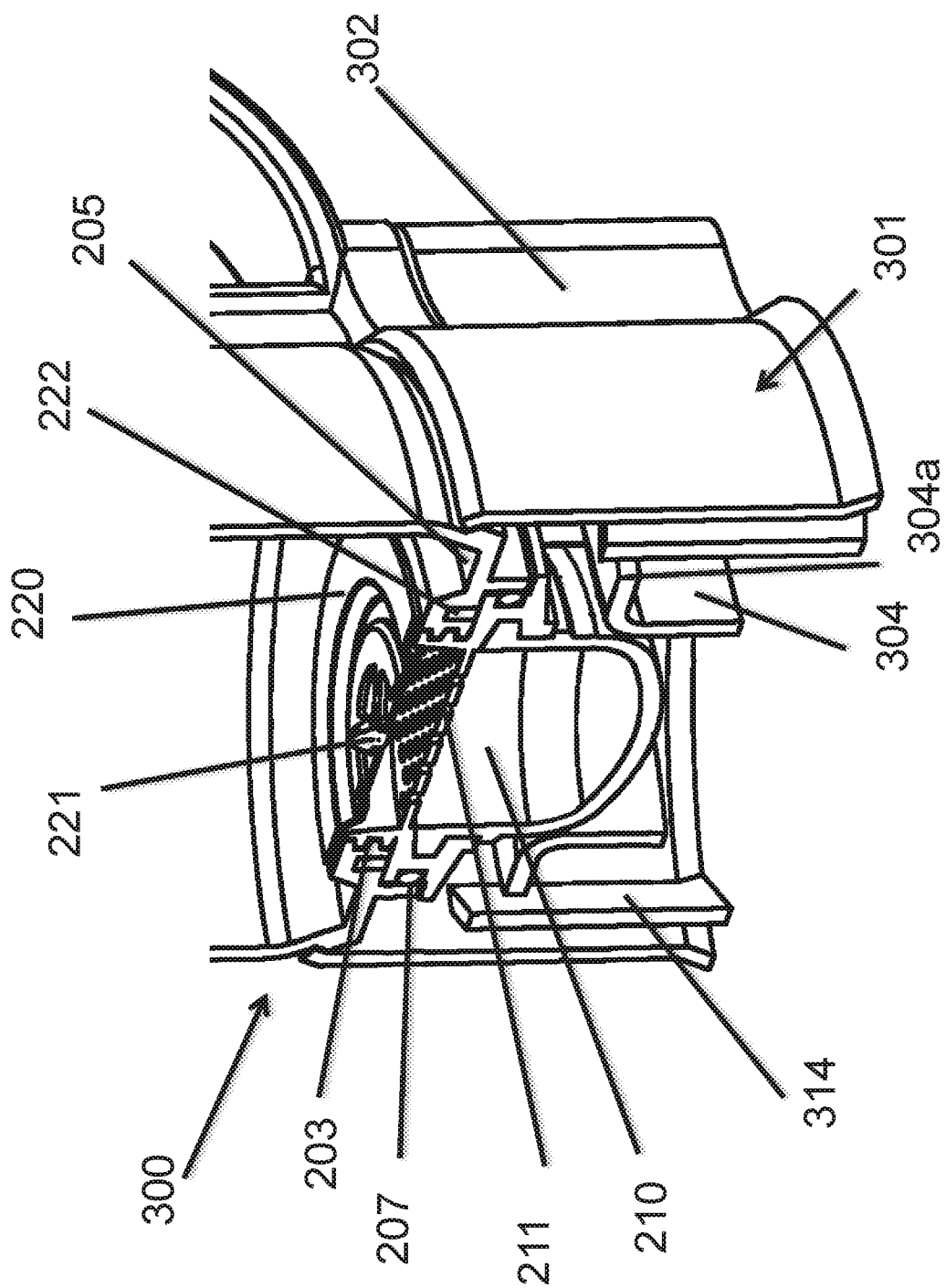
FIG. 3E schematically shows a 3-dimensional vertical cross-sectional view of the integral squeezable podium infusion instrument in a natural position.

FIG. 3E schematically shows a 3-dimensional vertical cross-sectional view of the integral squeezable podium infusion instrument 301 in a natural position.

Figure 3F:
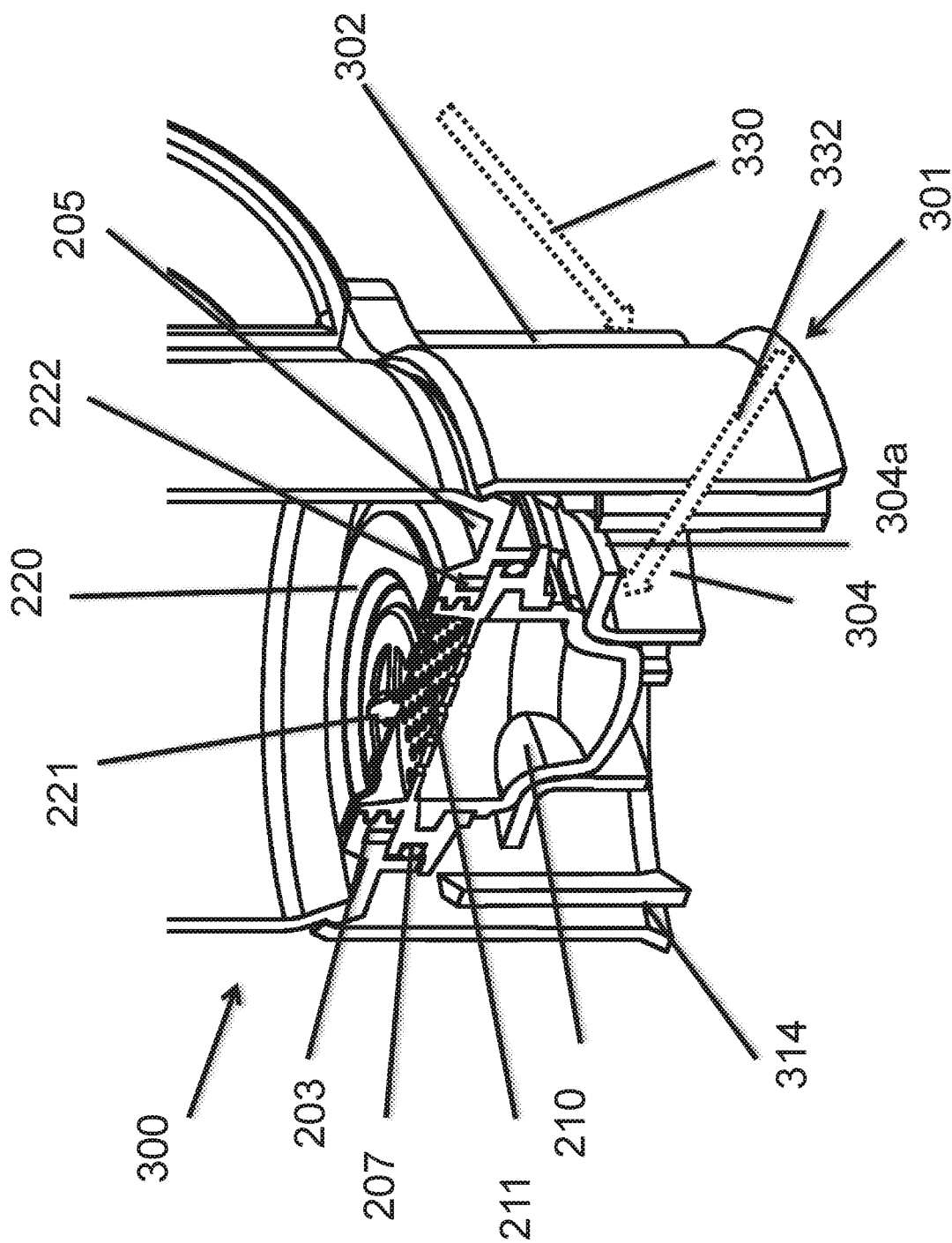
FIG. 3F schematically shows a 3-dimensional vertical cross-sectional view of the integral squeezable podium infusion instrument in a pushed position.

FIG. 3F schematically shows a 3-dimensional vertical cross-sectional view of the integral squeezable podium infusion instrument 301 in a pushed position.

Before starting tea-drink preparation, the flexible container 210 is removed from the cup fitting 206 and is filled with tea. Now, the flexible container 210 is placed back to its position at the bottom of the cup fitting 206. At this point the device is ready for tea-drink infusion and should be filled with hot water (or some other appropriate liquid).

After filling the cup with hot water, pushing the knob 302 for a few seconds will push and squeeze the flexible container 210. In this case, if the flexible container 210 is initially empty from liquid, when the push knob 302 is released, the flexible container 210 is expanding back and water from the cup 300 is sucked in 233 (not marked herein) through the valve 221. If the flexible container 210 is initially full of liquid, pushing and releasing the push knob 302 may create both in and out flow of liquid 231 and the liquids sucking flow 233 respectively (flows not marked herein). With a bit of experience, the tea drinker can learn how much and how many pushing is needed to produce the best tea-drink for her/his personal preference.

For cleaning, the integral squeezable podium infusion instrument 301 is separated from the cup 300. The top magnetic cover 220 is removed from the cup 300 and rinsed. The flexible container 210 is be removed from the cup fitting 206, emptied, and rinsed. The cup fitting 206 can be unscrewed from the cup 300 and rinsed. Now the cup 300 may be cleaned as any other cup. The rest of the integral squeezable podium infusion instrument 301 may be cleaned like any other kitchen tool.

The integral squeezable podium infusion instrument 301 is operated using the push knob 302. However, here the integral squeezable podium infusion instrument 301 is located below the cup 300. It should be noted this dictate having a hole at the cup 300 bottom. This hole is closed from below by the integral squeezable podium infusion instrument 301. Also seen in this FIG. 3A is the cup handle 309, which has no functional part in the integral squeezable podium infusion instrument 301 and may be omitted.

FIG. 3B schematically shows a 3-dimensional view from underneath of the cup 300 with the integral squeezable podium infusion instrument 301 and a lower push knob 302 in a natural position. Starting at the push knob 302 two tongs-like arms 304 with arced wings 304a are extended towards two diagonal plates 314. At this FIG. 3B the knob 302 is in a released (natural) position and the tongs-like arms 304 surrounds the flexible container 210. The flexible container 210 is here seen connected at the bottom of the cup fitting 206.

FIG. 3C schematically shows a horizontal cross-sectional view of the cup 300 with the integral squeezable podium infusion instrument 301 in a natural position. The figure shows a bottom view the same items of the integral squeezable podium infusion instrument 301 as in FIG. 3B and at the same position; only the viewpoint is different.

FIG. 3D schematically shows a horizontal cross-sectional view of the cup 300 with the integral squeezable podium infusion instrument 301 in a pushed position. This figure shows the same items of the integral squeezable podium infusion instrument 301 as in FIG. 3B and FIG. 3C. However, here, the push knob 302 is pushed in 330. As a result, the tongs-like 304 are pushed forward, the arced wings 304a are sliding on the diagonal plates 314. This is creating a squeezing effect 332 on the flexible container 210.

FIG. 3E schematically shows a 3-dimensional vertical cross-sectional view of the integral squeezable podium infusion instrument 301 in a natural position. The cup fitting 206 is connected to the cup 200 at the cup hole edge 205. In this exemplary embodiment the fitting 206 has a screw-like helical ridge 203, which is screwed to the hole edge 205; however, the fitting may be done using one of several possible options known in the art. To obtain good sealing, an O-ring seal 207 is also fitted between the cup fitting 206 and the hole edge 205. The hole edge 205 also holds a magnetic ring 222, designed to put and hold the top magnetic cover 220 in place. At the center of the cup fitting 206 a sieve 211 is located. The sieve 211 is designed to allow free flow of clean liquids up and down, while filtering the tea itself.

The state of the integral squeezable podium infusion instrument 301 seen here is the same as described in FIG. 3B Starting at the push knob 302, two tongs-like arms 304 with arced wings 304a are extended towards two diagonal plates 314. At this FIG. 3E the knob 302 is in a released (natural) position and the tongs-like arms 304 surrounds the flexible container 210.

FIG. 3F schematically shows a 3-dimensional vertical cross-sectional view of the integral squeezable podium infusion instrument 301 in a pushed position. This figure shows a view the integral squeezable podium infusion instrument 301 in the same state as in FIG. 3D. Here, the push knob 302 is pushed in 330. As a result, the tongs-like arms 304 is pushed forward, the arced wings 304a are sliding on the diagonal plates 314. This is creating a squeezing effect 332 on the flexible container 210.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An internal infusion instrument, for preparing tea-drink in a tea cup comprising:
   a movable sieve, to be filled with tea, and allowing liquid to flow through it while filtering said tea keeping said tea within said movable sieve;
   a movable neck connected in its bottom side to said sieve, and terminating with a knob at its top side;
   a stationary grip, for holding the internal infusion instrument to a rim of a cup; and
   a stationary cover connected to said grip,
   wherein in a closed state, said stationary cover covers said movable sieve, hindering flow of said liquid between the cup and said tea within said sieve, and
   wherein pushing said knob causes downward motion of said movable neck and said movable sieve, such that said stationary cover no longer hinders said flow of liquid between said cup and said tea within said movable sieve.

2. The instrument of claim 1, further comprising a spring, connected between said stationary cover and said movable neck, keeping said movable sieve in the closed state when said knob is not pushed.

3. The internal infusion instrument of claim 1, wherein pushing said knob causes forced flow of liquid into said movable sieve.

4. The internal infusion instrument of claim 3, wherein pushing said knob can be repeated to increase a concentration of the tea-drink.

5. The internal infusion instrument of claim 4, wherein said tea in said movable sieve can be replaced, and pushing said knob can be repeated to increase the concentration of the tea-drink.

6. The internal infusion instrument of claim 1, wherein releasing said knob causes forced flow of liquid out said movable sieve.

7. The internal infusion instrument of claim 1, further comprising a bottom cover at a bottom of said movable sieve, said cover is configured to: be opened to clean the inside of said movable sieve and to fill said movable sieve with tea, and to close said movable sieve for holding said tea within said movable sieve.

8. The internal infusion instrument of claim 7, wherein the width of said movable sieve is narrower at a point it is connected to said movable neck than its width at the bottom cover.

9. The internal infusion instrument of claim 8, wherein the shape of said movable sieve is conical.

10. The internal infusion instrument of claim 8, wherein the shape of said movable sieve is pyramidal.

11. The internal infusion instrument of claim 7, wherein said bottom cover is located near the bottom of said cup when the internal infusion instrument is installed on said cup.

12. A tea infusion system comprising:
   the internal infusion instrument of claim 1, and
   a cup for holding tea-drink, said cup having a rim, wherein said cup is configured such that said grip holds the internal infusion instrument.

13. The tea infusion system of claim 12, wherein the internal infusion instrument can be removed from said cup for cleaning said movable sieve and for filling said movable sieve with tea, and be installed on said cup, such that said movable sieve is inside said cup, for preparation of tea-drink.

14. The tea infusion system of claim 13, wherein the internal infusion instrument, when installed on said cup, is installed such that said movable sieve is located below the upper one third of a height of said cup.

15. The tea infusion system of claim 14, wherein the internal infusion instrument, when installed on said cup, is installed such that said movable sieve is located below the upper one half of the height of said cup.

16. The tea infusion system of claim 15, wherein the internal infusion instrument, when installed on said cup, is installed such that said movable sieve is located below the upper two thirds of the height of said cup.

17. The tea infusion system of claim 14, wherein pushing said knob causes forced flow of liquid into said movable sieve when said cup is half full of liquid.

18. The tea infusion system of claim 12, wherein pushing said knob causes forced flow of liquid from said cup into said movable sieve.

19. The tea infusion system of claim 12, wherein releasing said knob causes forced flow of liquid out said movable sieve into said cup.

* * * * *